L. TUBBS.
TOOTH BRUSH.
APPLICATION FILED JUNE 13, 1913.
1,082,919.
Patented Dec. 30, 1913.
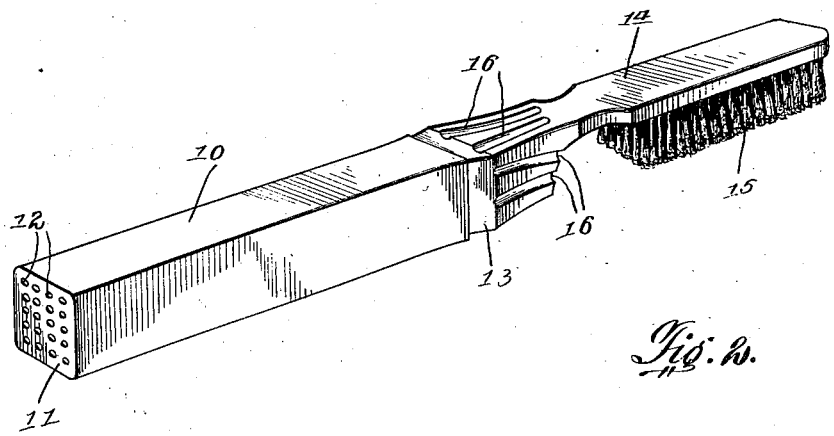
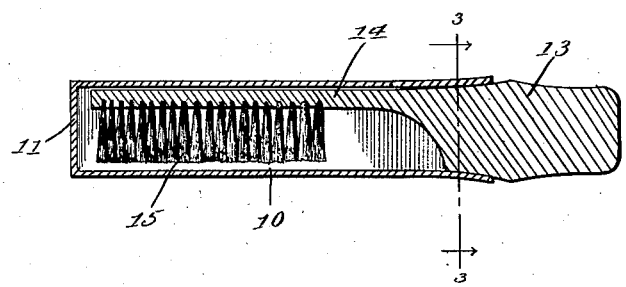
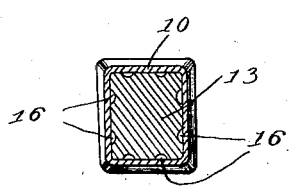
Witnesses
Frederich L. Fox,
Inventor
Lena Tubbs.
By Victor J. Evans,
Attorney

UNITED STATES PATENT OFFICE.

LENA TUBBS, OF CHARLESTON, SOUTH CAROLINA.

TOOTH-BRUSH.

1,082,919.  Specification of Letters Patent.  Patented Dec. 30, 1913.

Application filed June 13, 1913. Serial No. 773,480.

*To all whom it may concern:*

Be it known that I, LENA TUBBS, a citizen of the United States, residing at Charleston, in the county of Charleston and State of South Carolina, have invented new and useful Improvements in Tooth-Brushes, of which the following is a specification.

The invention relates to tooth brushes, and has for an object to provide a simple and effective foldable tooth brush which will at all times be clean and sanitary.

The invention embodies, among other features, the provision of a tooth brush which includes a brush body adapted to normally lie within a casing suitably perforated to permit of air passing therethrough and keeping the brush body in a clean and sanitary condition, the said brush body being also adapted to be held on the casing after being removed therefrom so that the casing will constitute a handle for the brush body and the said brush body being furthermore so arranged upon the casing in an open position as to prevent any dripping from the brush body from passing into the casing or handle.

In the further disclosure of the invention reference is to be had to the accompanying drawings, constituting a part of this specification, in which similar characters of reference denote corresponding parts in all the views, and in which:

Figure 1 is a perspective view of the tooth brush, showing the tooth brush in open position on the casing or handle; Fig. 2 is a vertical longitudinal sectional view, with the brush body shown in closed position; and Fig. 3 is a vertical transverse sectional view taken on the line 3—3 in Fig. 2.

Referring more particularly to the views, I provide a casing 10 constituting a suitable handle and provided on an end 11 thereof with a series of perforations 12. A head 13 includes a shank 14 carrying a brush body 15, the said head 13 being tapered toward the shank 14 and tapered toward its free end as shown. The tapered portion nearest the shank 14 is provided with a series of longitudinal passages 16, the said passages when the brush body is in closed position with respect to the casing being adapted to permit air to pass through the casing and retain the brush body in a clean and sanitary condition to quickly dry the same after the brush body has been used, it being readily apparent that by having the perforations 12 in one end of the casing and having the passages 16 at the other end of the casing a current of air will readily pass through the casing to dry the brush body.

The normal position of the brush body with respect to the casing is shown in Fig. 2, with the head 13 constituting a closure for one end of the casing 10, it being readily apparent that the brush body will be held in closed position by the inner tapered portion of the head being in frictional engagement with the edge of the casing at the open end thereof. Now in the use of the device, when it is desired to employ the brush body for brushing the teeth it will be apparent that the brush body can be readily removed from the casing by removing the head from engagement therewith and then by reversing the head and sticking the other or tapered end of the head into the casing to frictionally engage the same, it will be apparent that the brush body will be rigidly supported on the casing and which constitutes a handle for the brush body; that by having the open edge of the casing in frictional engagement with the apex formed by the oppositely tapered portions of the head the casing will be substantially closed so that any drops of water from the brush body and which pass down the passages 16 will be prevented from entering the casing and which will at all times be in a dry condition so that when the brush body is folded within the casing as mentioned heretofore it will quickly dry therein and, furthermore, will be protected from dust and dirt.

Having thus described my invention, I claim:

As a new article of manufacture, a tooth brush comprising a casing having an open end and a perforated end, a head including a shank carrying a brush body, and the said head having a series of longitudinal air passages, with one end of the head adapted for engagement with the casing to support the brush body in open position thereon and the end of the head having the passages therein adapted for engagement with the casing when the brush body is arranged therein, the said air passages being open to the exterior of the casing to permit the passage of air through the perforated end of the casing and the said air passages.

In testimony whereof I affix my signature in presence of two witnesses.

LENA TUBBS.

Witnesses:
T. P. DE GIFFERELLY,
L. J. TUBBS.